Feb. 8, 1966

G. A. WAHLMARK 3,233,555

VARIABLE DISPLACEMENT FLUID DEVICE

Filed Aug. 16, 1962

INVENTOR.
Gunnar A. Wahlmark,
BY Byron, Hume, Groen & Clement
Attorneys.

Feb. 8, 1966

G. A. WAHLMARK 3,233,555

VARIABLE DISPLACEMENT FLUID DEVICE

Filed Aug. 16, 1962

INVENTOR.
*Gunnar A. Wahlmark,*
BY
*Byron, Hume, Groen & Clement*
Attorneys.

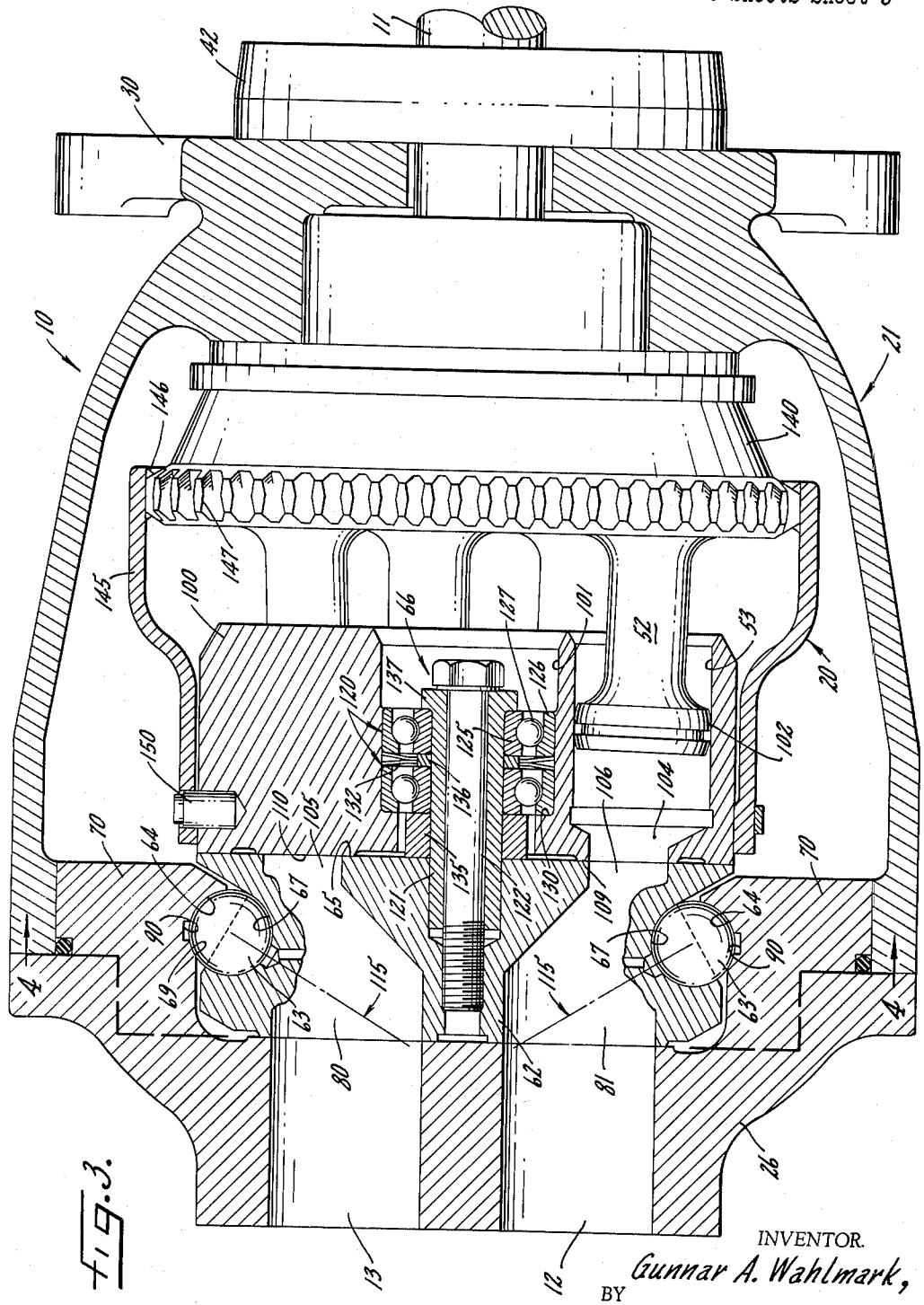

Feb. 8, 1966 G. A. WAHLMARK 3,233,555
VARIABLE DISPLACEMENT FLUID DEVICE
Filed Aug. 16, 1962 6 Sheets-Sheet 4

INVENTOR.
Gunnar A. Wahlmark,
BY Byron, Hume, Groen, & Clement
Attorneys.

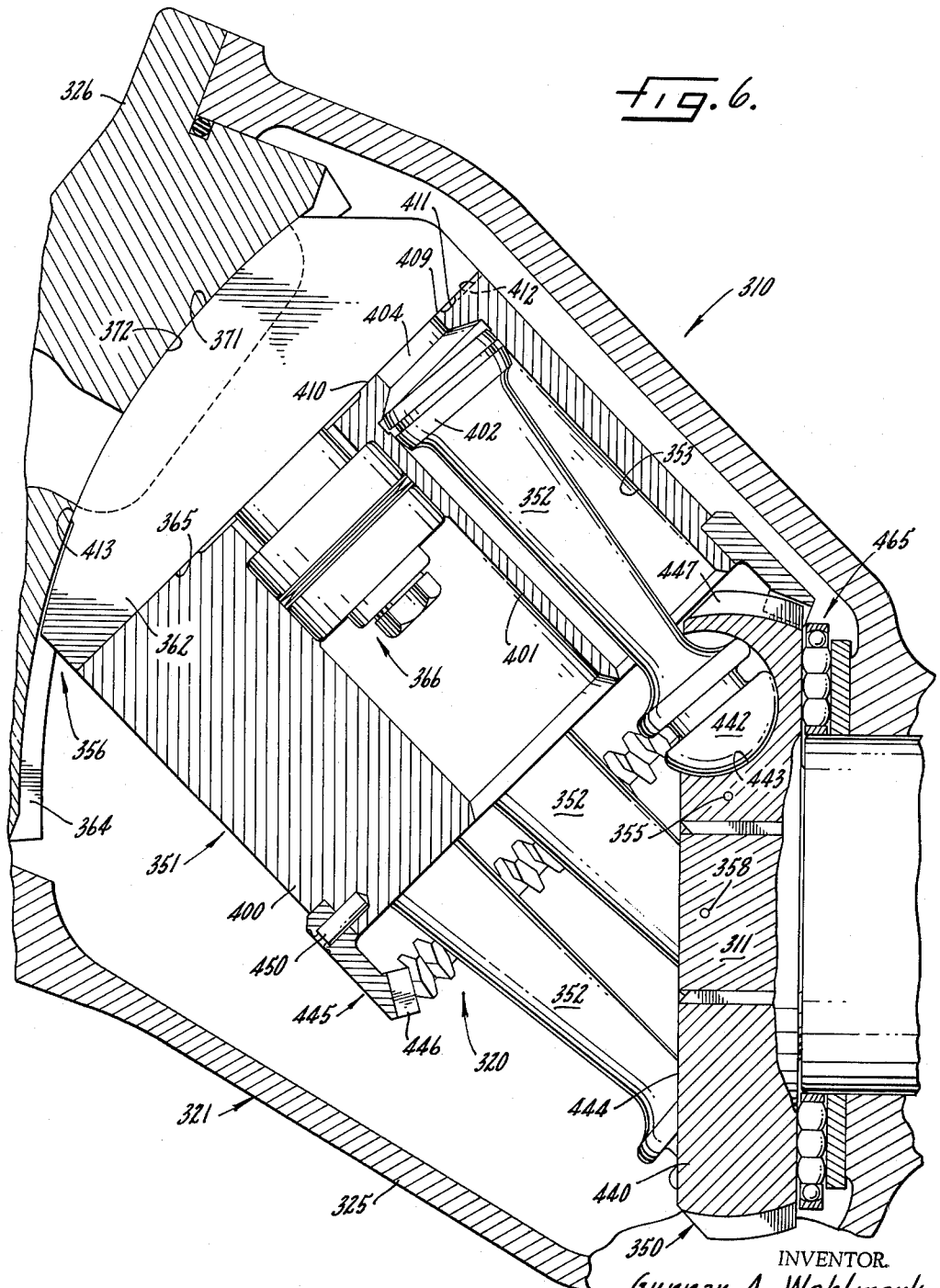

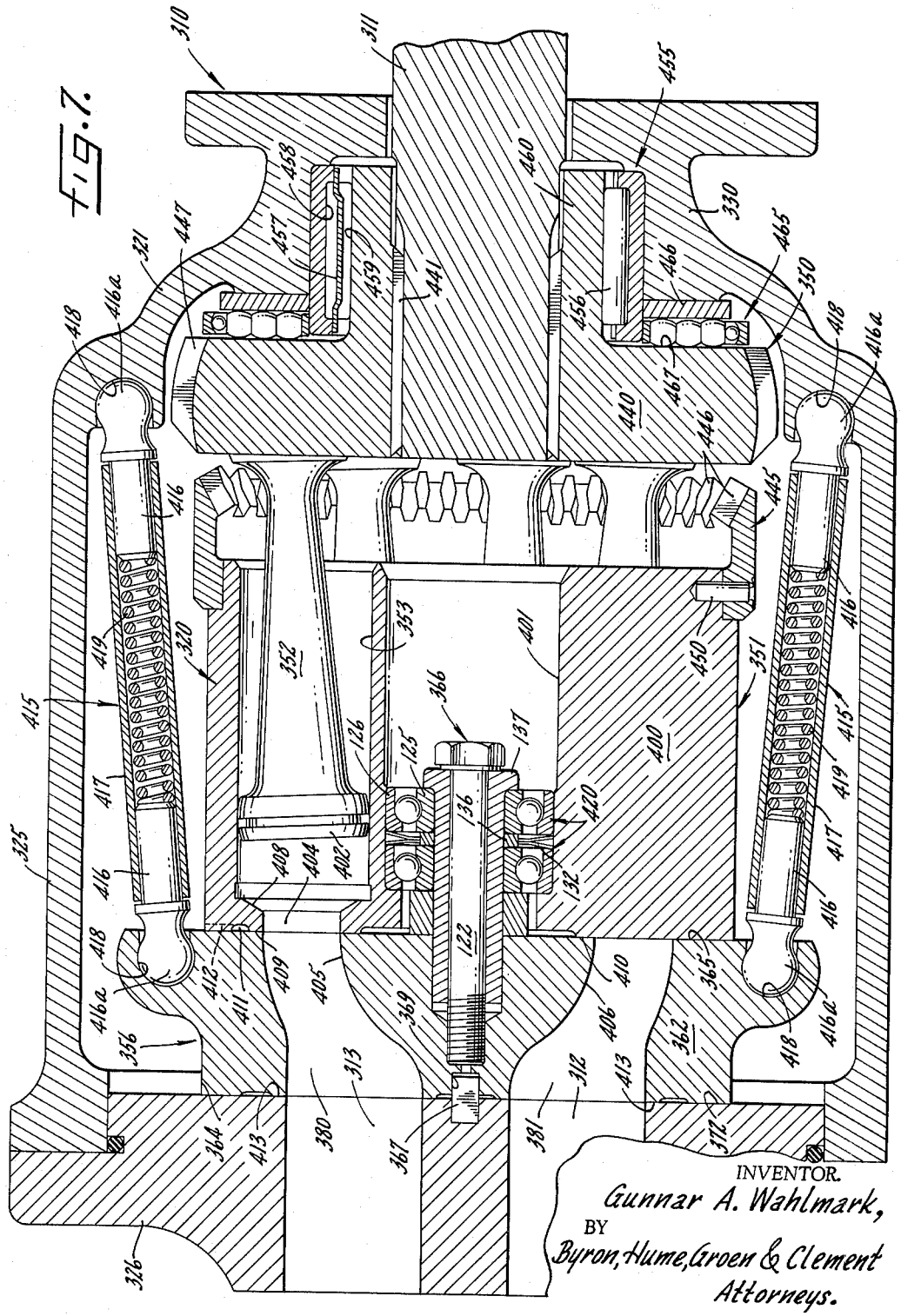

United States Patent Office 3,233,555
Patented Feb. 8, 1966

3,233,555
VARIABLE DISPLACEMENT FLUID DEVICE
Gunnar A. Wahlmark, 211 S. Rockford Ave.,
Rockford, Ill.
Filed Aug. 16, 1962, Ser. No. 217,346
5 Claims. (Cl. 103—162)

This invention relates in general to variable displacement fluid devices and more particularly to swash plate type fluid pumps or motors. It deals specifically with an improved swash plate variable displacement fluid pump or motor.

As pointed out in my co-pending application entitled Variable Displacement Fluid Device, Ser. No. 838,868, now Patent No. 3,136,264, filed Sept. 9, 1959, the trend in the technology of fluid pumps and motors has generally been toward higher speed, lighter weight units in order to assure better performance with units which take up less space and weight than their predecessors. These light, efficient units find advantageous application in many and varied fields where hydraulic systems are desirable. For example, they are readily adaptable to use in various applications; from agricultural equipment, where their relatively small size and high efficiency characteristics permit radical improvements in equipment design, to aircraft systems and the like.

Swash plate variable displacement fluid devices are especially adaptable to applications where these attributes are prerequisite. The present invention is embodied in an improved swash plate variable displacement fluid device.

It is an object of the present invention to provide an improved variable displacement fluid pump or motor.

It is another object to provide a swash plate variable displacement fluid device wherein a rotatable cylinder barrel is mounted for otherwise unsupported reaction directly against the housing of the device.

It is still another object to provide a swash plate variable displacement fluid device wherein the rotatable cylinder barrel is not pivotally supported on the housing through trunnions or the like.

It is yet another object to provide a device of the aforedescribed character wherein a cylinder barrel is supported on a new and improved anti-frictional mounting assembly in angularly movable relationship with the swash plate.

It is a further object to provide an anti-frictional mounting assembly of the aforedescribed character which is lubricated under all pump operating conditions.

It is yet a further object to provide a new and improved face bearing assembly for supporting the swash plate.

It is still a further object to provide a roller face bearing assembly of the aforedescribed character which is more durable, simpler in construction, and is less expensive than presently known bearing assemblies of a generally similar nature.

It is another object to provide a new and improved method of manufacturing face bearing assemblies of the aforedescribed character.

These and other objects are realized in accordance with the present invention by providing an improved concept in swash plate variable displacement fluid pumps and motors. The invention contemplates a cylinder barrel rotatably mounted, for otherwise unsupported reaction, against that end of the fluid device housing opposite the swash plate. The cylinder barrel is urged toward this end of the housing by a slight unbalance of fluid pressures as it rotates relative to a piston port plate angularly movable on the housing in support of the cylinder barrel.

In a first embodiment of the present invention, the cylinder barrel and piston port plate are mounted directly against the aforementioned end of the housing in substantially anti-frictional relationship for angular movement relative to the swash plate to vary the displacement of the device. Lubrication of the anti-frictional mounting is assured throughout the angular range of travel of the barrel and the port plate.

In a second embodiment of the present invention, the cylinder barrel and piston port plate are mounted directly against the aforementioned end of the housing for angular sliding movement relative to the swash plate.

Another aspect of the present invention is embodied in a new and improved face bearing assembly for the rotatable swash plate. Its construction assures longer bearing life as well as facilitating simpler and less expensive manufacture. Still another aspect of the invention is embodied in the method of manufacturing the face bearing assembly.

Other objects, features, and advantages of the present invention will be apparent from the following description taken in conjunction with the accompanying drawings, in which:

FIGURE 3 is a partially sectionalized top plan view of the fluid device illustrated in FIGURES 1 and 2;

FIGURE 6 is a partially sectionalized side elevational view, with parts removed, of the variable displacement fluid device incorporating features of the second embodiment of the present invention;

FIGURE 7 is a partially sectionalized top plan view of the fluid device illustrated in FIGURE 6;

Figure 9:
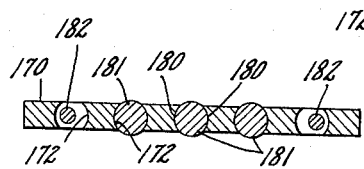
FIGURE 9 is a sectional view taken along line 9—9 of FIGURE 8.
Figure 8:
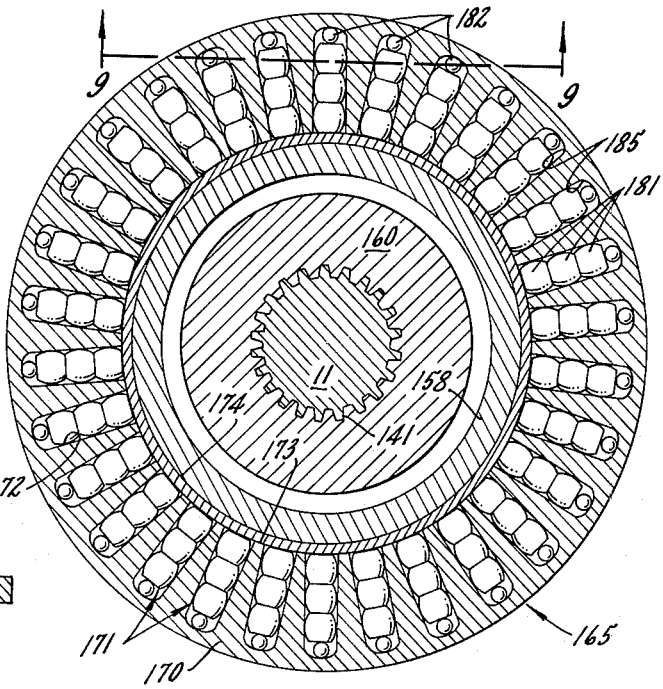
FIGURE 8 is a sectional view taken along line 8—8 of FIGURE 2, illustrating a face bearing assembly embodying features of another aspect of the present invention.
Figure 10:
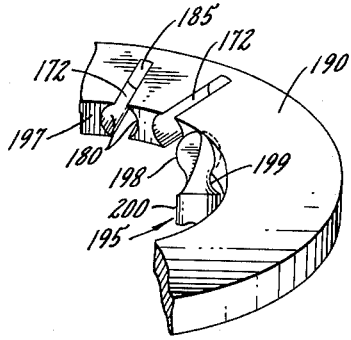
Figure 11:
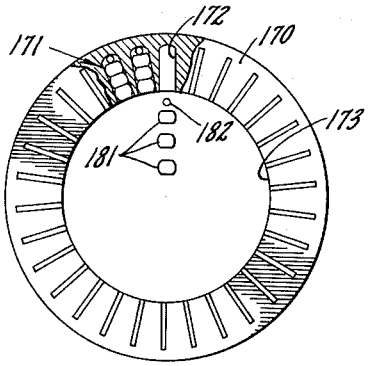
Figure 12:
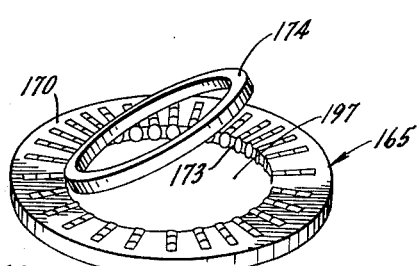

FIGURE 10 is a diagrammatic fragmentary perspective view of a principal step in the manufacture of the face bearing assembly illustrated in FIGURES 8 and 9; and FIGURE 11 is a diagrammatic plan view of a succeeding step in the manufacture of the face bearing assembly illustrated in FIGURES 8 and 9; and FIGURE 12 is a diagrammatic perspective view of a further succeeding step in the manufacture of the face bearing assembly illustrated in FIGURES 8 and 9.

Referring now to the drawings, two embodiments of the variable displacement fluid device defining features of the present invention are disclosed, as has been pointed out. A first embodiment of the device, in the form of a pump, is illustrated generally at 10 in FIGURES 1 through 4. A second embodiment of the device, also in the form of a pump, is illustrated generally at 310 in FIGURES 6 and 7. The pumps 10 and 310 are of the general type illustrated and described in my aforementioned co-pending application entitled Variable Displacement Fluid Device. In like manner, the present invention is described, in each instance, in the context of a variable displacement pump although it might alternatively take the form of a fluid motor. Correspondingly, the pump utilizes hydraulic fluid, although it might utilize other fluids.

The pumps 10 and 310 embody a common primary concept devoted to accomplishing a common primary end, of course. This primary concept is found in the relationship established between the generally conventional swash plate, cylinder barrel, and pump housing components of the pumps 10 and 310. In essence, unlike generally similar fluid devices heretofore known, the cylinder barrel component and the swash plate component are urged apart by fluid pressure in the cylinders; the cylinder barrel component being angularly movably mounted against a corresponding end of the housing component rather than being supported on a relatively complex and expensive trunnion arrangement. As a result, a simpler, more compact, more durable, less expensive swash plate variable displacement fluid device is provided. Furthermore, the cylinder barrel and swash plate components are urged apart by only a slight effective pressure and, consequently, lubrication between appropriate bearing surfaces is not impaired. The pumps 10 and 310 differ generally in that the pump 10 incorporates a new and improved anti-frictional mounting for the cylinder barrel components, for reasons hereinafter discussed, while the pump 310 incorporates a sliding mounting construction. Other distinguishing (as well as common) features will be discussed also, of course.

The pump 10 illustrating features of the first embodiment of the present invention is shown in vacuo, as can readily be seen. However, it should be understood that in operative relationship it is normally connected to a power source such as a gas turbine (not shown) through a power take-off shaft 11 and high pressure hydraulic fluid is delivered to an appropriate driven component (not shown) from the high pressure outlet port 12 in the pump. In turn, the pump 10 is replenished with hydraulic fluid from its driven component through a closed hydraulic fluid circuit (not shown) and the low pressure inlet port 13.

Figure 1:
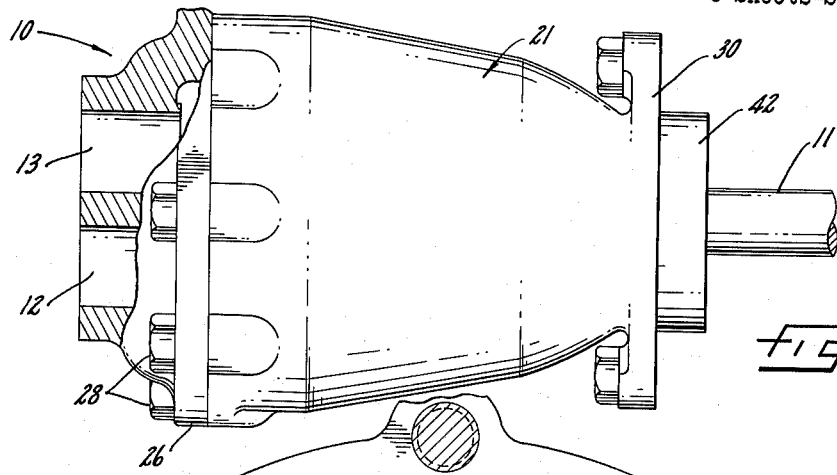
FIGURE 1 is a side elevational view, partially in section, of a swash plate variable displacement fluid device incorporating features of the first embodiment of the present invention.
Figure 4:
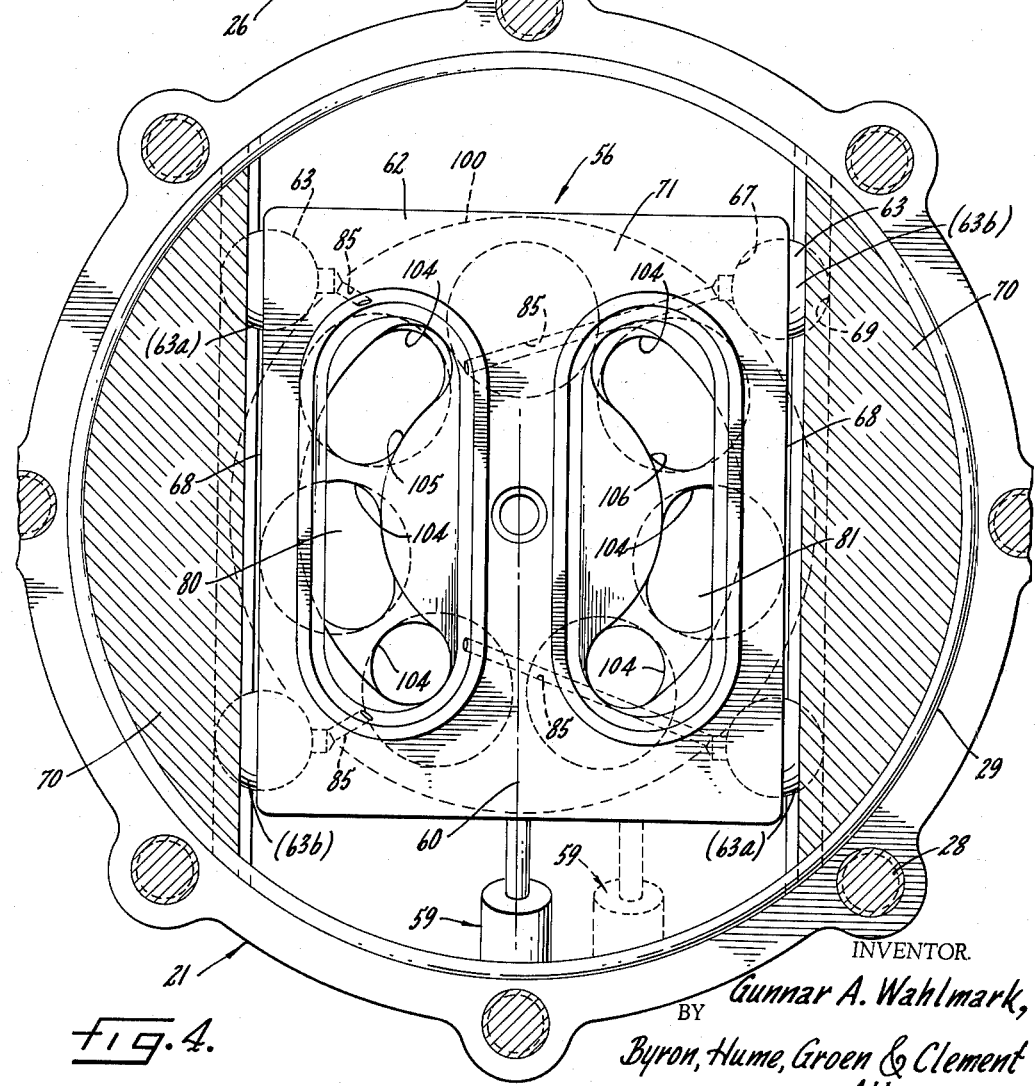
FIGURE 4 is a view taken along line 4—4 of FIGURE 3.
Figure 2:
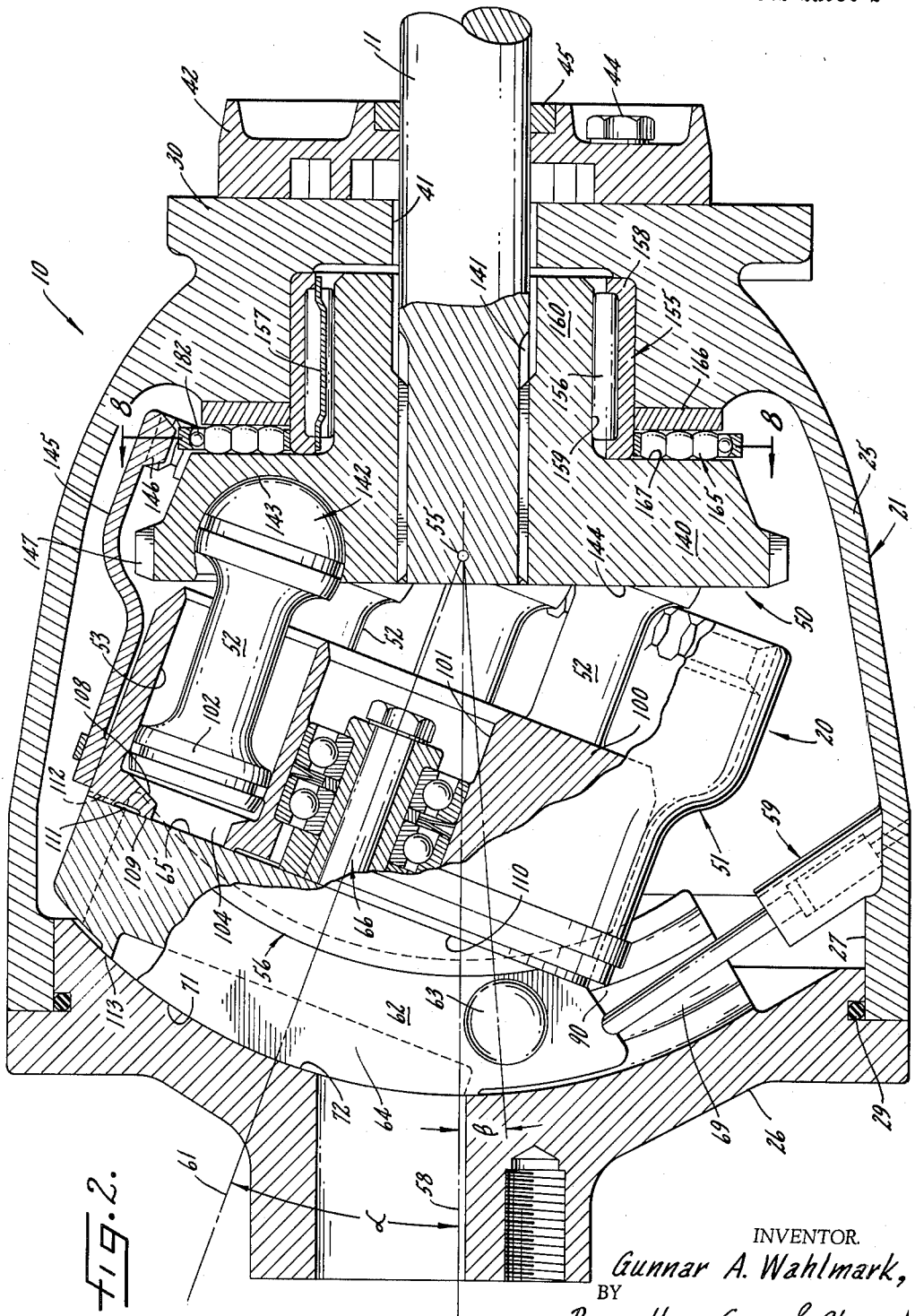
FIGURE 2 is a partially sectionalized side elevational view, with certain features shown diagrammatically, of the fluid device illustrated in FIGURE 1.

Referring now to FIGURES 2-4, it will be seen that the pump 10 comprises a variable displacement pump assembly 20 operatively disposed within a pump housing 21 composed of a steel or aluminum alloy or the like. The pump 10 is, broadly speaking, a "swash plate" hydraulic pump, the displacement of which is readily varied to deliver varying quantities of hydraulic fluid under pressure from the outlet port 12. The pump assembly 20 is generally comprised of hardened steel components, unless otherwise indicated.

The pump housing 21 is a two-piece construction and includes a body 25 and a port cap 26 fixedly secured at the open end 27 of the body 25 by means of a plurality of machine screws 28. An O-ring seal 29 of suitable material is disposed between the cap 26 and the body 25 of the housing 21. The outlet port 12 and the inlet port 13 extend axially of the pump 10 through the cap 26 in side-by-side fashion and are preferably internally threaded to receive appropriate fluid conduits (not shown). At the closed end 30 of the housing 21, the drive shaft 11 extends through an appropriate aperture 41 into driving relationship with the pump assembly 20. A sealing cap 42 of generally conventional construction is secured to the body 25 by conventional machine screws 44 and supports a sealing member 45 in surrounding relationship with the shaft 11 to seal the housing 21 against the entrance of foreign material and the escape of hydraulic fluid. The previously described power source (not shown) rotates the drive shaft 11 at from 24,000 to 60,000 r.p.m. (for example), which in turn rotates the pump mechanism 20 to pump hydraulic fluid under pressure out of the outlet port 12 after receiving it from the inlet port 13.

The pump assembly 20 includes a swash mechanism 50 which is rotated by the drive shaft 11, and is, in turn, drivingly connected to a tiltable cylinder barrel mechanism 51 through a plurality of pistons 52 reciprocable in corresponding cylinders 53 in the cylinder barrel mechanism. The pump 10 illustrated utilizes seven piston members 52 and corresponding cylinders 53. However, it should be understood that the number seven is exemplary and more or less might be utilized, as they often are.

The cylinder barrel mechanism 51 is tiltable relative to the swash mechanism 50 to vary the angular relationship therebetween and consequently vary the displacement of the pump. In tilting, according to the present invention, the cylinder barrel mechanism 51 is supported on the port cap 26 of the pump 10 and unsupported by trunnions or the like. It is supported for pivotal movement about the axis 55 on a new and improved anti-frictional mounting assembly 56 embodying features of the first embodiment of the present invention. The axis 55 lies on the axis 58 of rotation of the swash mechanism 50 in this case. As will be hereinafter illustrated in relation to a second embodiment of the present invention, however, the axis 55 might be displaced from the swash mechanism axis 58 in the manner disclosed in my aforementioned co-pending application entitled Variable Displacement Fluid Device. The anti-frictional mounting assembly 56 supports the cylinder barrel mechanism 51 for rotation relative thereto as the mounting assembly and the cylinder barrel mechanism tilt relative to the swash mechanism 50. Simultaneously, hydraulic fluid courses through the anti-frictional mounting assembly 56 from the low pressure inlet port 13 to the cylinders 53 and from corresponding cylinders back to the high pressure outlet port 12. The cylinder barrel mechanism 51 and the mounting assembly 56 are urged toward the port cap 26 by fluid pressure in the cylinders 53, according to the present invention, the cylinder barrel mechanism 51 being otherwise unsupported by the pump housing 21 (through trunnions, for example).

The angular relationship between the cylinder barrel mechanism 51 and the swash plate mechanism 50 is preferably varied through the medium of a displacement control unit, seen generally at 59, mounted within the body 25 of the housing 21 and operatively connected to the anti-frictional mounting assembly 56. Since the displacement control unit 59, as such, forms no part of the present invention, however, it is illustrated somewhat diagrammatically and not described in detail. Nevertheless, it should be pointed out, for reasons hereinafter discussed, that the unit 59 is preferably operatively connected to the anti-frictional mounting assembly 56 on the center line 60 thereof, as seen in FIGURE 4, to obviate imparting torque to the assembly 56.

With the pump assembly 20 adjusted to the relationship shown in FIGURE 2 by the displacement control unit 59, the axis 61 of the cylinder barrel mechanism 51 is disposed at the maximum "swash" angle, designated by the symbol α, from the axis 58 of the swash mechanism 50. In this relationship, maximum stroke of the pistons is achieved so that the pump 10 delivers hydraulic fluid under pressure from the outlet port 12 at a maximum rate. In the pump 10 illustrated, the maximum angle which design permits is 20°. The minimum angle and consequently the minimum pump displacement is effected, of course, when the axis 61 of the cylinder barrel mechanism 51 is in alignment with the axis 58 of the swash mechanism 50.

To reverse the pumping direction of the pump 10, the cylinder barrel mechanism 51 is pivoted so that the axis 61 thereof is below the axis 58 of the swash mechanism 50. As a result, the outlet port 12 becomes the low pressure inlet port while the inlet port 13 becomes the high pressure outlet port. In certain applications of both pumps and motors, the reversal of the direction of fluid flow in this manner is desirable and the pump 10 illustrates a construction wherein a reverse angle β (5° in this case) can be established. As will be understood, an infinite number of pump displacements can be established between the maximum swash angles α and β.

The anti-frictional mounting assembly 56 incorporated in the pump 10 construction in accordance with features of the first embodiment of the present invention includes a piston port plate 62 which is mounted for travel on ball bearings 63 in a channel 64 in the port cap 26. The port plate 62 rotatably mounts the cylinder barrel mechanism 51 in bearing relationship against the inner bearing face 65 of the plate 62 on a bearing shaft assembly 66. The plate 62 is preferably composed of a bearing bronze, or the like, for obvious reasons.

As best seen in FIGURES 3 and 4, there are two ball bearings 63 seated in corresponding sockets 67 spaced on each side 68 of the port plate 62, or four ball bearings in all. The ball bearings 63 roll in substantially arcuate tracks 69 disposed opposite each other in the side walls 70 of the channel 64. The arc of the tracks 69 is such that the pivot axis of the port plate 62, relative to the swash mechanism 50, is at 55. While the plate 62 rides in the tracks 69, its outer bearing face 71 is seated against the base surface 72 of the channel 64 in fluid tight relationship. The base surface 72 is a segmental cylindrical surface also, having its axis at 55.

Figure 5:
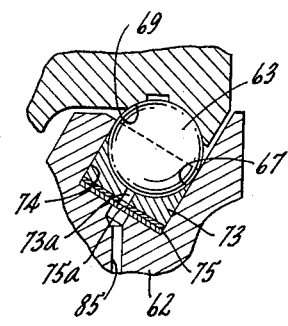
FIGURE 5 is an enlarged view, partially in section, of an alternative anti-frictional bearing mounting for the port plate in the fluid device illustrated in FIGURES 1-4.

In rolling back and forth in the tracks 69, it will be understood that the presence of lateral play in the mounting of the port plate 62, is undesirable. Such play frequently results in "chattering" and increased pump wear. Referring now to FIGURE 5, to obviate such play the effective width of the port plate 62 is preferably made adjustable by making the bearing sockets 67 on one side 68 of the plate 62 adjustable as to depth. Each socket 67 on side 68 of the plate 62 is formed in a removable plug 73 seated in an appropriately formed bore 74, the base of which contains a predetermined number of shims 75. The number of shims 75 is selected, of course, to seat the plug 73 at a depth wherein the breadth of the port plate 62, including the ball bearings 63, exactly spans the distance between the oppositely disposed tracks 69.

Turning once more to FIGURES 2-4, the port plate 62 conducts hydraulic fluid at charging pressure (which might be 50 to 100 p.s.i.) from the inlet port 13 to appropriate cylinders 53 in the cylinder barrel mechanism 51, and subsequently from these cylinders at outlet pressure (which might be approximately 3,000 p.s.i.) to the high pressure outlet port 12 through a transversely elongated low pressure inlet passage 80, and a corresponding transversely elongated high pressure outlet passage 81. The passages 80 and 81, because of their transversely elongated configuration, permit unrestricted flow of hydraulic fluid to and from the ports 12 and 13 regardless of the relative positions of port plate 62 and the port cap 26.

While appropriately positioned cylinders 53 are charged with hydraulic fluid through the inlet port 13 and the inlet passage 80, the ball bearings 63 are constantly lubricated through lubrication conduits 85 in the port plate 62, extending from the inlet passage 80 to each ball bearing socket 67. Where a plug 73 and shims 75 are utilized, as seen in FIGURE 5 and hereinbefore described, they are apertured, as at 73a and 75b respectively, to facilitate the passage of lubricating fluid. A channel 90 formed in the base of each track 69 serves to retain a supply of lubricating fluid on the tracks beneath the ball bearings 63.

As long as the port plate 62 is not subjected to substantial torque imparting forces, the ball bearings 63 are adequately lubricated in the foregoing manner. In this light, the only torque to which the block 62 is normally subjected results from friction between the rotating cylinder barrel mechanism 51 and the port plate 62. This torque is relatively insignificant, however, and is usually ineffective to exert sufficient pressure on the lead ball bearings 63 (identified secondarily as 63a) to break down the lubricant film which surrounds them.

However, if the displacement control unit 59 is offset from the center line 60 of the pump 10, as a matter of design expediency (as shown in dotted lines in FIGURE 4), a counter-clockwise torque is obviously imparted to the port plate 62 when the pump displacement is increased. To counteract this torque and prevent lubrication breakdown around the lead ball bearings 63a, the lubrication conduits 85 might be connected to the high pressure outlet passage 81 in the port plate 62 (as seen in dotted lines in FIGURE 4). Hydraulic fluid at operating pressure is thus delivered to all the ball bearings 63. Consequently, a lubrication film surrounding these bearings 63 is maintained regardless of the pressure exerted on them through torque imparted to the port plate 62. In this light, it is essential that the lagging ball bearings 63 (identified secondarily at 63b) be high pressure lubricated also, since a decrease in pump displacement, as effected by the unit 59, imparts clockwise torque to the port plate 62.

As has previously been pointed out, the cylinder barrel mechanism 51 is rotatably mounted on the bearing shaft assembly 66 in bearing relationship against the inner bearing face 65 of the port plate 62. The cylinder barrel mechanism 51 in question is of broadly well-known construction and includes a cylinder barrel 100 in which the seven cylinders 53 are bored in a conventional manner. An axially disposed bore 101 extends through the barrel 100 and receives the bearing shaft assembly 66, upon which the barrel is retained for rotation. Each cylinder 53 receives a piston 52 which is, in turn, connected to the swash mechanism 50, as has been pointed out. Each piston includes a piston head 102 which moves in a well-known manner in a corresponding cylinder 53 and might be constructed in the manner disclosed in another of my co-pending applications entitled, Drive Connection for Fluid Device, Ser. No. 133,233, filed Aug. 22, 1961.

Each cylinder 53 has a fluid access port 104 which ordinarily communicates with either the inlet passage 80 or the outlet passage 81 in the port plate 62 as the barrel 100 rotates. In this light, the passages 80 and 81 define generally kidney-shaped ports 105 and 106 in the inner bearing face 65 of the port plate 62 (see FIGURE 4) to facilitate communication between the access ports 104 and the passages 80 and 81 in a prescribed sequence as the cylinder barrel 100 rotates. Hydraulic fluid under charging pressure is received in the appropriate cylinders 53 as they pass under the kidney-shaped port 105 and is discharged at rated pump pressure from appropriate cylinders 53 as they pass under the kidney-shaped port 106.

As the cylinder barrel 100 rotates, it is urged against the inner bearing face 65 on the port plate 62 by fluid pressure in the cylinders 53. In accordance with the present invention, the cylinder barrel 100 is otherwise unsupported from the pump housing 21, as has been pointed out. In being so urged, however, it is desirable that the forces urging the barrel 100 against the port plate 62 are not so high as to break down lubrication therebetween and cause excessive wear. Consequently, the pump assembly 20 is constructed in such a manner that only a slight pressure unbalance in the direction of the port plate 62 is effective. This pressure unbalance is established by designing the pump assembly 20 so that the effective transverse surface of the end lands 108 in the cylinders 53 is slightly greater than the effective surface area of the bearing land 109 formed in surrounding relationship with the fluid access ports 104 on the bearing face 110 of the cylinder barrel 100. Average cylinder pressure thus urges the cylinder barrel 100 against the inner bearing face 65 of the port plate 62 with a force only slightly in excess (approximately 5% is preferable) of the force exerted upon the bearing land 109 by fluid pressure developed between the inner bearing face 65 and the bearing land 109, through leakage. The total surface area of the bearing land 109 alone controls the force effective to separate the cylinder barrel 100, of course, because the channel 111 defining the outer periphery of the land 109 is exhausted to the casing (and casing pressure) through radial exhaust channels 112.

The outer bearing face 71 of the port plate 62 is, in turn, urged against the arcuate base surface 72 of the channel 64, according to the present invention. To prevent separation of the plate 62 from the base surface 72 of the channel 64, the total bearing surface area of the outer bearing face 71 on the port plate 62 is reduced to that of the bearing lands 113, as seen in FIGURE 4. This area is calculated so that the fluid pressure forces tending to separate the port plate 62 from the base surface 72 of the channel 64 are reduced to slightly less than the force exerted on the port plate 62 by the cylinder barrel 100.

The cylinder barrel 100 and the port plate 62 are urged toward the port cap 26 by cylinder fluid pressure only when the pump 10 is operating, however. Obviously, it is also desirable to assure that the port plate 62 is seated against the arcuate base surface 72 of the channel 64 at the outset of pump operation. This result is assured because the axes 115 of the sockets 67 in which the ball bearings 63 are seated are inclined in a manner shown in FIGURE 3. Accordingly, when hydraulic fluid under charging pressure initially enters the lubricant conduits 85 it urges the ball bearings 63 outwardly in their sockets 67 and tends to force the bearing lands 113 of the port plate 62 into seated relationship against the arcuate base surface 72 of the channel 64.

At the same time, the bearing shaft assembly 66 is effective to bias the cylinder barrel 100 against the inner bearing face 65 of the port plate 62 precedent to pressure being developed in the cylinders 53. The bearing shaft assembly 66 comprises a spaced pair of roller bearing assemblies 120, upon which the cylinder barrel 100 is mounted for rotation about a sleeve 121 secured to the port plate 62 through a machine bolt 122. Each roller bearing assembly 120 includes an inner bearing race 125 immediately surrounding the sleeve 121 and an outer bearing race 126 which rotates about the inner bearing race 125 on roller bearings 127 and cooperates in carrying the cylinder barrel 100 for rotation about the axis 61.

The innermost of the outer bearing races 126 abuts a shoulder 130 formed in the bore 101 extending through the cylinder barrel 100, while the outermost of the outer bearing races 126 bears against a pair of spring washers 132 separating the two outer bearing races. As will be seen, the construction of the outer bearing races 126 permits them to move towards the port plate 62 relative to the roller bearings 127 but not in the opposite direction. Since the inner bearing races 125 and the roller bearings 127 are axially fixed by the spacer rings 135 and 136 and the flange 137 formed on the sleeve 121, the cylinder barrel 100 is biased toward the port plate 62 by the spring washers 132. Consequently, the cylinder barrel bearing land 109 is seated on the inner bearing face 65 of the port plate 62 precedent to, as well as during, pump operation.

As has been pointed out, cylinder pressure and consequently pump outlet pressure is developed through the rotation of the cylinder barrel 100 by the swash mechanism 50. The swash mechanism 50 comprises a swash plate 140 splined to the shaft 11, as at 141, for rotation therewith, and universally connected to the ball joint ends 142 formed on the piston members 52 opposite the piston heads 102. The ball joint ends 142 are preferably substantially identical to those disclosed in my aforementioned co-pending application entitled, Drive Connection for Fluid Device and are received and locked in sockets 143 formed in the face 144 of the swash plate 140 in a manner also disclosed therein. Since the details of the ball joint universal connections form no specific part of the present invention, however, they are not discussed at length. Suffice it to say that the ball joint ends 142 are universally retained in corresponding sockets 143 regardless of the angular relationship between the piston members 52 and the swash plate 140.

Rotation of the swash plate 140 by the shaft 11 effects rotation of the cylinder barrel mechanism 51, primarily through torque transmitted by the reciprocation of the piston members 52 in the cylinder 53. Effective as a second medium of torque transfer, as well as synchronizing the rotation of the swash plate 140 and the cylinder barrel 100, is a drive collar 145 secured to the cylinder barrel 100 and carrying internal gear teeth 146 which mesh with external gear teeth 147 formed on the periphery of the swash plate 140. The drive collar 145 is secured to the cylinder barrel 100 by pins 150 extending into the cylinder barrel 100 (see FIGURE 3). The internal gear teeth 146 and the external gear teeth 147 are preferably double helical teeth of the type disclosed in my aforementioned co-pending application entitled, Drive Connection for Fluid Device to provide constant speed synchronized rotation of the cylinder barrel 100 and the swash plate 140 at all relative angles therebetween.

As the swash plate 140 rotates, it is supported in bearing relationship on a roller bearing arrangement 155. The roller bearing arrangement 155 is generally conventional and comprises a plurality of roller bearings 156 spaced in a cage 157 and adapted to rotate between an outer bearing race 158 seated within the pump housing body 25 and an inner bearing race 159 on the neck portion 160 of the swash plate 140.

In the same manner in which the cylinder barrel 100 and the port plate 62 are urged against the port cap 26 by cylinder pressure, the swash plate 140 is, of course, oppositely urged against the closed end 30 of the pump housing 21. To support the swash plate 140 in thrust bearing relationship, a face bearing assembly 165 embodying features of another aspect of the present invention is mounted between a face bearing plate 166 seated against the closed end 30, and the annular planar face 167 on the swash plate 140. The face bearing assembly 165, which is free to rotate with the swash plate 140, will be discussed in detail subsequent to the following description of the variable displacement fluid pump 310 defining features of the aforementioned second embodiment of the present invention, to which the face bearing assembly 165 is preferably common.

Turning now to FIGURES 6 and 7, and the aforementioned second embodiment of the present invention, the pump 310 is seen to be broadly similar to the pump 10, hereinbefore described in detail. Since the pumps 10 and 310 are broadly similar, the description of the pump 310 is treated in relatively general terms, except in those areas which distinguish it from the pump 10.

The pump 310 comprises a variable displacement pump assembly 320 operatively disposed within a housing 321 comprising a body 325 and a port cap 326 appropriately connected. A fluid outlet port 312 and inlet port 313 in the housing 321 afford fluid access from and to the pump assembly 320, as it is rotated by a drive shaft 311.

The pump assembly 320 includes a swash mechanism 350 rotated directly by the shaft 311 and drivingly connected to a tiltable cylinder mechanism 351 through a plurality of pistons 352 reciprocable in corresponding cylinders 353 in the cylinder barrel mechanism. The cylinder barrel mechanism 351 is tiltable relative to the swash mechanism 350 to vary the displacement of the pump 310. In tilting, according to the present invention, the cylinder barrel mechanism 351 is supported on the port cap 326 of the pump 310, and unsupported by a trunnion arrangement or the like. It is supported for a movement about an axis 355 on a mounting assembly 356 which is indigenous to the second embodiment of the present invention. The axis 355 is displaced from the axis 358 of the rotation of the swash mechanism 350 in the direction of maximum pump displacement. As one result of this displaced axial relationship, the cylinder mechanism 351 is constantly urged towards maximum pump displacement during operation. The rationale and advantages behind such a result are discussed in my aforementioned co-pending application entitled, Variable Displacement Fluid Device. Since this relationship, in detail, forms no part of the present invention, it is not discussed herein, however. Furthermore, it should be understood that under some circumstances the pump 310 might be constructed so that the axis 355 is below the axis 358 and the cylinder mechanism 351 is constantly urged toward minimum displacement.

The mounting assembly 356 supports the cylinder barrel mechanism 351 for rotation relative thereto as the mounting assembly and the cylinder barrel mechanism tilt relative to the swash mechanism 350. Simultaneously, hydraulic fluid courses through the mounting assembly 356 from the low pressure inlet port 313 to the cylinders 353 and from corresponding cylinders back to the high pressure outlet port 312. The cylinder barrel mechanism 351 and the mounting assembly 356 are urged toward the port cap 326 by fluid pressure in the cylinder 353, the cylinder barrel mechanism 351 being otherwise unsupported by the pump housing 321.

The angular relationship between the cylinder barrel mechanism 351 and the swash plate mechanism 350 might be varied through the medium of a displacement control unit generally similar to the control unit 59 (not shown) described in relation to the first embodiment of the present invention. For the same reason discussed in relation thereto, a displacement control unit preferably is operatively connected to the anti-frictional mounting assembly 356 in such a manner that torque is not imparted to the assembly 356 when the displacement of the pump 310 is varied. The pump 310 facilitates the establishment of a relatively wide range of pump displacements in much the same manner as the aforedescribed pump 10.

The mounting assembly 356 includes a piston port plate 362 which is mounted for sliding travel in a relatively shallow channel 364 in the port cap 326. The port plate 362 rotatably mounts the cylinder barrel mechanism 351 on a bearing shaft assembly 366, in bearing relationship against the inner bearing face 365 of the plate 362, as the port plate slides on a generally arcuate key 367 seated in the base surface 372 of the channel 364. A track 369 formed in the outer bearing face 371 of the port plate 362 receives the key 367. The arc of the track 369 and the base surface 372 of the channel 364, the latter being a segmentally cylindrical surface, have a common axis at 355, and the port plate 362 slides in the channel 364 on the track 369 in support of the rotating cylinder mechanism 351 as the displacement of the pump 310 is varied.

The port plate 362 conducts hydraulic fluid at charging pressure from the inlet port 313 to the appropriate cylinders 353 in the cylinder barrel mechanism 351 and subsequently from the cylinders at outlet pressure to the high pressure outlet port 312 through a transversely elongated low pressure inlet passage 380 and a corresponding transversely elongated high pressure outlet passage 381 respectively. The passages 380 and 381, because of their transversely elongated configuration, permit unrestricted flow of hydraulic fluid to and from the ports 312 and 313, regardless of the relative positions of the port plate 362 and the port cap 326.

Referring now to the cylinder barrel mechanism 351 more particularly, it should be understood that it is substantially identical to the cylinder barrel mechanism 51 described in relation to the first embodiment of the present invention. The barrel mechanism 351 is rotatably mounted on the bearing shaft assembly 366 in bearing relationship against the inner bearing face 365 of the port plate 362 and includes a cylinder barrel 400 in which the seven cylinders 353 are bored in a conventional manner. An axially disposed bore 401 extends through the barrel 400 and receives the bearing shaft assembly 366, upon which the barrel is retained for rotation. Each cylinder 353 receives a piston 352 which is, in turn, connected to the swash mechanism 350 as has previously been pointed out. Each piston 352 includes a piston head 402 which moves in a well-known manner in a corresponding cylinder 353, and might also be constructed in the manner disclosed in my aforementioned co-pending application, entitled Drive Connection for Fluid Device.

Each cylinder 353 has a fluid access port 404 which ordinarily communicates with either the inlet passage 380 or the outlet passage 381 in the port plate 362 as the barrel 400 rotates. The passages 380 and 381 define kidney ports 405 and 406 in the inner bearing face 365 of the port plate 362 and facilitate communication between the access ports 404 and the passages 380 and 381 in the prescribed sequence as the cylinder barrel 400 rotates. In a manner substantially identical to the operation of the aforedescribed pump 10, hydraulic fluid under charging pressure is received in the appropriate cylinders 353 as they pass under the kidney port 405 and is discharged at rated pressure from appropriate cylinders 353 as they pass under the kidney port 406.

As the cylinder barrel 400 rotates, it is urged against the inner bearing face 365 of the port plate 362 by fluid pressure in the cylinders 353 in the manner hereinbefore described in relation to the pump 10 defining features of the first embodiment of the present invention. In a similar manner, the cylinder barrel 400 is otherwise unsupported from the pump housing 321. Again, only a slight pressure unbalance in the direction of the port plate 362 is effective, however, so as not to cause lubrication break-down between the port plate 362 and the cylinder barrel 400. The slight unbalance of pressure is, of course, established by constructing the pump 310 so that the effective transverse surface area of the end lands 408 in the cylinders 353 is slightly greater than the effective surface area of the bearing land 409 formed in surrounding relationship with the fluid access ports 404 on the bearing face 410 of the cylinder barrel 400. Average cylinder pressure thus urges the cylinder barrel 100 against the inner bearing face 365 of the port plate 362 with a force only slightly in excess of the force exerted upon the bearing land 409 by fluid pressure developed between the inner bearing face 365 and the bearing land 409, through leakage. The total surface area of the bearing land 409 alone controls the force effective to separate the cylinder barrel 400 because the channel 411 defining the outer periphery of the land 409 is exhausted to the casing (and casing pressure) through the radial exhaust channels 412.

The outer bearing face 371 of the port plate 362, is, in turn, urged against the arcuate base surface 372 of the channel 364. To prevent separation of the plate 362 from the base surface 372 of the channel 364, the total bearing surface area of the outer bearing face 371 on the port plate 362 is reduced to that of the bearing lands 413, seen generally in FIGURE 7 (and identical to the bearing lands 113 of the aforedescribed pump 10). This area is calculated so that the fluid pressure forces tending to separate the port plate 362 from the base surface 372 of the channel 364 are reduced to slightly less than the force exerted on the port plate 362 by the cylinder barrel 400.

In like manner to the construction and operation of the pump 10, the cylinder barrel 400 and the port plate 362 are urged toward the port cap 326 by cylinder fluid pressure only when the pump 310 is operating. To assure that the port plate 362 is seated against the arcuate base surface 372 of the channel 364 at the outset of pump operation, a pair of oppositely disposed expansion arm assemblies 415 are provided, extending between the housing body 325 and the port plate 362, as seen in FIGURE 7.

The arm assemblies 415 serve the same end in the pump 310 that the canted axes 115 of the ball bearing 63 mountings do in relation to the pump 10. They urge the port plate 362 against the port cap 326 without the benefit of cylinder pressure. As will be seen, each expansion arm assembly 415 includes a pair of oppositely disposed ball joint pins 416 slidably received in, and abutting a sleeve 417. The balls 416a formed on the pins 416 seat in appropriately formed sockets 418 in the pump housing body 325 and the port plate 362 in bracketing relationship with the cylinder barrel mechanism 351, as illustrated, a compression spring 419 in the sleeve 417 continually urges the ball joint pins 416 outwardly of the sleeve. Accordingly, it will be seen that even prior to fluid pressure being built up in the cylinders 353 the port plate 362 is urged against the port cap 326 with sufficient pressure to assure satisfactory seating of the components for initiation of pump operation. The sockets 418 in the housing body 325 are, of course, in lateral alignment with the axis 355 to assure that the distance between corresponding sockets 418 remains constant as pump displacement is varied.

At the same time, the bearing shaft assembly 366 is effective to bias the cylinder 400 against the inner bearing face 365 of the port plate 362 precedent to pressure being developed in the cylinders 353. The bearing shaft assembly 366 is identical in construction to the bearing shaft assembly 66 hereinbefore described in relation to the pump 10 and similarly biases the cylinder barrel 400 against the inner bearing face 365 of the port plate 362. In light of the identity between the bearing shaft assemblies 66 and 366, a detailed description of the bearing shaft assembly 366 and its operation is not thought to be necessary. Suffice it to say that identical reference numerals, plus 300 digits, identify like components of the two bearing shaft assemblies 66 and 366.

As can now be well understood, pump outlet pressure is developed through the rotation of cylinder barrel 400 by the swash mechanism 350. The swash mechanism 350 comprises a swash plate 440 splined to the shaft 311, as at 441, for rotation therewith, and universally connected to the ball joint ends 442 formed on the piston members 352 opposite the piston head 402. The ball joint ends 442 are received and locked in sockets 443 formed in the face 444 of the swash plate 440 in a manner hereinbefore discussed in relation to the pump 10.

Rotation of the swash plate 440 by the shaft 311 effects rotation of the cylinder barrel mechanism 351 primarily through torque transmitted by the reciprocation of the piston members 352 in the cylinders 353. Similar to the construction of the pump 10, and effective as a secondary medium of torque transfer, as well as synchronizing the rotation of the swash plate 440 and the cylinder barrel 400, is a drive collar 445 secured to the cylinder barrel 400 and carrying internal gear teeth 446 which mesh with external gear teeth 447 formed on the periphery of the swash plate 440. The drive collar 445 is secured to the cylinder barrel 400 by pins 450 as seen in FIGURE 6. The internal gear teeth 446 are preferably double helical teeth of the type disclosed in my aforementioned copending application entitled, Drive Connection for Fluid Devices and provide substantially constant speed synchronized rotation of the cylinder barrel 400 and the swash plate 440 throughout a substantial range of angular relationships therebetween. The external gear teeth 447 are substantially elongated, as will be noted, to assure that the teeth 446 and 447 engage at various angular relationships between the swash mechanism 350 and the cylinder barrel mechanism 351.

As the swash plate 440 rotates, it is supported in bearing relationship on a roller bearing arrangement 455. The roller bearing arrangement 455 is generally conventional and substantially identical to the roller bearing arrangement 155 described in relation to the pump 10. It comprises a plurality of roller bearings 456 spaced in a cage 457 and adapted to rotate between an outer bearing race 458 seated within the pump housing body 325 and an inner bearing race 459 on the neck portion 460 of the swash plate 440.

Similar to the operation of the aforementioned pump 10, as the cylinder barrel 400 and the port plate 362 are urged against the port cap 326 by cylinder pressure the swash plate 440 is oppositely urged against the closed end 330 of the pump housing body 325. To support the swash plate 440 in thrust bearing relationship, a face bearing assembly 465 embodying features of the aforementioned other aspect of the present invention is mounted between a face bearing plate 466 seated against the closed end 330, and the annular planar face 467 of the swash plate 440.

Turning now to a description of the face bearing assemblies 165 and 465, which are identical, and referring to FIGURE 8 where the assembly 165 is shown in the context of the pump 10, it will be seen that they include a spider 170 which carries a bearing sub-assembly 171 in each of a series of radially extending, segmentally cylindrical slots 172 formed outwardly from the annular inner periphery 173 of the spider. The bearing sub-assemblies 171 are retained in corresponding slots 172 by a ring 174 press fit into the annular inner periphery 173 of the spider 170.

As best seen in FIGURE 9, the segmentally cylindrical slots 172 formed in the spider 170 each comprise two oppositely disposed arcuate faces 180. The bearing sub-assemblies 171, each of which preferably comprise three generally "barrel" shaped roller bearings 181 and a crown ball bearing 182, fit precisely into and are retained in the slots 172 by the press fit ring 174, in the manner illustrated. Each crown ball bearing 182 is prevented from moving laterally out of a corresponding slot 172 because it seats in a concave well 185 (see FIGURES 2 and 6) in the base of the slot.

The operation of a face bearing assembly 165 (or 465) as the swash plate 140 (or 440) rotates, is obvious. The generally "barrel" shaped roller bearings 181 rotate in corresponding slots 172 in appropriate substantially line contact with corresponding bearing faces and are supported in anti-frictional radial thrust relationship against the crown ball bearings 182. The face bearing assembly 165 (or 465) is ultimately simple in construction and consequently affords little opportunity for mechanical failure. Because of its simplicity, it is obviously relatively inexpensive.

It is the method of manufacture of the face bearing assemblies 165 and 465 which contributes substantially to their low cost. Referring now to FIGURE 10, the spider 170 of a bearing assembly 165 (or 465) is formed from a flat ring 190 of alloy steel or the like. Initially, an end mill bit 195 which is appropriately mounted on a milling machine (not shown) is inserted into the central aperture 197 of the disc 190. The end mill bit 195 has a substantially spherical cutting head 198 formed thereon and a relatively narrow neck 199 connecting the head 198 to the body 200 of the bit. The bit 195 is moved radially outwardly of the ring 190 while the rotating, generally spherical cutting head 198 mills out a slot 172, simultaneously forming the opposed arcuate faces 180 of the slot and the concave well 185 at the bottom thereof. The ring 190 is rotated slightly after each milling operation and the next adjoining slot 172 is milled. The diameter of the spherical cutting head 198 is slightly greater than the thickness of the ring 190, of course, as a result the slots extend from face to face of the ring 190, as illustrated.

Referring now to FIGURE 11, after the spider 170 is manufactured in the foregoing manner, three cylindrical roller bearings 181 and a crown ball bearing 182 are seated in each slot 172 where they form a bearing sub-assembly 171. The overall length of each bearing sub-assembly 171 is substantially equal to the depth of a corresponding slot 172 so that the innermost roller bearings 181 are almost flush with the annular inner periphery 173 of the spider and the crown ball bearings 182 cannot move laterally out of corresponding wells 185 in the slots 172 when the inner ring 174 is in place.

In the next step, as seen in FIGURE 12, the inner ring 174 of predetermined diameter is press fit into the central aperture 197 whereby it fits snugly in engagement with the annular inner periphery of the spider 170. The ring 174, which is preferably composed of an alloy steel, retains the bearing sub-assemblies 171 in the spider 170 when the bearing assembly is not rotating. The bearing sub-assemblies 171 are retained in corresponding slots 172 by centrifugal force during operation of the pump 10.

It will be seen that two embodiments of an improved variable displacement fluid device have been illustrated and described. They embody a revolutionary simplicity of pump and motor construction in which the cylinder barrel mechanism and swash plate mechanism are appropriately urged apart by fluid pressure, yet the well known pivotal mounting arrangement for the cylinder barrel mechanism, for example, is totally eliminated.

In addition, a new and improved face bearing assembly construction forms a superior thrust bearing arrangement for the swash mechanism.

The invention is further highlighted by the anti-frictional mounting assembly described in relation to the first embodiment of the present invention. This anti-frictional mounting assembly for a cylinder barrel assures long, trouble-free operation of the pump throughout its service life, as well as assuring numerous other advantages hereinbefore discussed.

While several embodiments described herein are considered to be preferred at present, it is understood that various modifications and improvements might be made therein, and it is intended to cover in the appended claims all such modifications and improvements as fall within the true spirit and scope of the invention.

What is desired to be claimed and secured by Letters Patent of the United States is:

1. A swash plate type variable displacement fluid device, comprising, a housing having an arcuate port segment defined therein, a port plate having bearing surface means seated against said port segment for arcuate sliding movement about an axis, a cylinder barrel having cylinder means formed therein and seated for rotation in bearing relationship against said port plate, swash means rotatable in said housing, piston means slidable in said cylinder means and connected to said swash means, the development of fluid pressure in said cylinder means during normal operation of the device producing a predetermined first effective force tending to urge said cylinder barrel and said port plate toward said port segment, said bearing surface means on said port plate comprising bearing land means of predetermined relatively small surface area precalculated to produce a predetermined second effective force of slightly less magnitude than said first predetermined effective force tending to urge said port plate away from said port segment when subjected to leakage fluid under pressure during normal operation of said device, whereby said port plate is urged in a critical pressure balance lightly toward said port segment during said normal operation.

2. The fluid device of claim 1 further characterized by and including resilient means extending between housing and said port plate to urge said port plate against said port segment when said fluid pressure produced forces are ineffective.

3. The fluid device of claim 1 further characterized in that said first predetermined effective force exceeds said second predetermined effective force by approximately five percent.

4. The fluid device of claim 2 further characterized in that said resilient means comprises at least two spring arm assemblies bracketing said cylinder barrel and pivotally mounted against said housing substantially on said axis.

5. The fluid device of claim 4 further characterized by and including an arcuate key member seated in said port segment, and keyway means complementary with said key member formed in said port plate, whereby said port plate is guided in sliding movement on said port segment by said key member cooperating with said keyway means.

References Cited by the Examiner

UNITED STATES PATENTS

| | | | |
|---|---|---|---|
| 2,298,850 | 10/1942 | Vickers | 103—162 |
| 2,313,407 | 3/1943 | Vickers et al. | 103—162 |
| 2,674,782 | 4/1954 | Surtees | 29—149.5 |
| 2,804,828 | 9/1957 | Grad | 103—162 |
| 2,955,350 | 10/1960 | Gardiner | 29—149.5 |
| 2,967,491 | 1/1961 | Wiggermann | 103—162 |
| 2,975,720 | 3/1961 | Schoellhammer | 103—162 |
| 2,990,784 | 7/1961 | Wahlmark | 103—162 |
| 3,040,672 | 6/1962 | Foerster et al. | 103—162 |
| 3,053,197 | 9/1962 | Lambeck | 103—162 |
| 3,056,358 | 10/1962 | Pederson | 103—162 |
| 3,092,036 | 6/1963 | Greighton | 103—162 |
| 3,124,079 | 3/1964 | Boyer | 103—162 |

FOREIGN PATENTS 1,268,698    6/1961    France.

DONLEY J. STOCKING, *Primary Examiner.*

LAURENCE V, EFNER, *Examiner.*